(12) United States Patent
Ou et al.

(10) Patent No.: US 10,186,244 B2
(45) Date of Patent: Jan. 22, 2019

(54) SOUND EFFECT PROCESSING METHOD AND DEVICE, PLUG-IN UNIT MANAGER AND SOUND EFFECT PLUG-IN UNIT

(71) Applicant: TENCENT TECHNOLOGY (SHENZHEN) COMPANY LIMITED, Shenzhen, Guangdong (CN)

(72) Inventors: Wenjun Ou, Shenzhen (CN); Guoming Chen, Shenzhen (CN); Yuanjiang Peng, Shenzhen (CN); Hong Liu, Shenzhen (CN); Xingping Long, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/038,907

(22) PCT Filed: Nov. 11, 2014

(86) PCT No.: PCT/CN2014/090826
§ 371 (c)(1),
(2) Date: May 24, 2016

(87) PCT Pub. No.: WO2015/078293
PCT Pub. Date: Jun. 4, 2015

(65) Prior Publication Data
US 2017/0025105 A1 Jan. 26, 2017

(30) Foreign Application Priority Data
Nov. 29, 2013 (CN) .......................... 2013 1 0633280

(51) Int. Cl.
*G10H 1/00* (2006.01)
*H04H 60/04* (2008.01)
*G11B 27/031* (2006.01)

(52) U.S. Cl.
CPC .......... *G10H 1/0091* (2013.01); *H04H 60/04* (2013.01); *G11B 27/031* (2013.01)

(58) Field of Classification Search
CPC .. H04R 25/505; H04R 25/70; H04R 2225/41; G06F 3/16; G06F 3/165; G10H 1/0091;
(Continued)

(56) References Cited

U.S. PATENT DOCUMENTS 4,998,281 A * 3/1991 Sakata ................. G10H 1/0091
381/63
5,292,996 A * 3/1994 Ogawa ................. G10H 1/0091
84/626
(Continued)

FOREIGN PATENT DOCUMENTS

CN 101013595 A 8/2007
CN 102227773 A 10/2011
(Continued)

OTHER PUBLICATIONS

International Search Report and Written Opinion of the ISA for PCT/CN2014/090826, ISA/CN, Haidian District, Beijing, dated Jan. 30, 2015.

*Primary Examiner* — Yogeshkumar Patel
(74) *Attorney, Agent, or Firm* — Morgan, Lewis & Bockius LLP

(57) ABSTRACT

Provided are a sound effect processing method and device. The sound effect processing method includes: invoking a pre-loaded plug-in unit manager to acquire a sound effect processing parameter supported by each preloaded sound effect plug-in unit; acquiring a sound effect configuration file pre-configured by the plug-in unit manager; displaying
(Continued)

sound effect index identifiers corresponding to various sound effect modes; according to a selected sound effect index identifier, determining a selected sound effect mode, and according to an adjustment interface, acquiring adjusted parameter control data; sending the adjusted parameter control data to a selected sound effect plug-in unit; and invoking the plug-in unit manager to send data to be processed to the selected sound effect plug-in unit, and according to the adjusted parameter control data, conducting sound effect processing on the data to be processed by the selected sound effect plug-in unit.

14 Claims, 11 Drawing Sheets

(58) Field of Classification Search
CPC ............. G10H 1/0025; G10H 1/0066; G10H 2210/105; G10H 2210/116; H04H 60/04; H04H 20/89; H04H 60/07; G11B 27/034; G11B 27/28
USPC ............ 381/312, 98, 103, 107; 700/94; 1/1; 704/E15.044; 84/626
See application file for complete search history.

(56) References Cited

U.S. PATENT DOCUMENTS

| | | | | |
|---|---|---|---|---|
| 5,635,658 | A * | 6/1997 | Kondo | G10H 1/0066 84/626 |
| 5,652,797 | A * | 7/1997 | Okamura | G10H 1/0091 381/118 |
| 6,162,983 | A * | 12/2000 | Takahashi | G10H 1/0091 84/615 |
| 7,155,676 | B2 * | 12/2006 | Land | G06Q 10/10 715/731 |
| 7,369,665 | B1 * | 5/2008 | Cheng | G10H 1/0091 381/119 |
| 7,875,789 | B2 * | 1/2011 | Mizuhiki | G10H 1/0075 84/600 |
| 8,674,206 | B2 * | 3/2014 | Georges | G10H 1/0025 84/600 |
| 8,705,765 | B2 * | 4/2014 | Bongiovi | H04L 25/03012 381/103 |
| 9,507,560 | B2 * | 11/2016 | Beckhardt | G06F 3/165 |
| 9,619,431 | B2 * | 4/2017 | Carrier | G10H 1/0008 |
| 2002/0065568 | A1 * | 5/2002 | Silfvast | G10H 1/0058 700/94 |
| 2004/0016338 | A1 * | 1/2004 | Dobies | G10H 1/0091 84/662 |
| 2004/0030425 | A1 * | 2/2004 | Yeakel | H04H 60/04 700/94 |
| 2004/0117358 | A1 * | 6/2004 | von Kaenel | G06F 17/30241 |
| 2004/0260702 | A1 * | 12/2004 | Cragun | G06F 17/30873 |
| 2004/0260714 | A1 * | 12/2004 | Chatterjee | G06F 17/30873 |
| 2004/0260717 | A1 * | 12/2004 | Albornoz | G06F 17/30873 |
| 2005/0076023 | A1 * | 4/2005 | Wu | G06F 17/30864 |
| 2005/0125716 | A1 * | 6/2005 | Cragun | G06F 17/241 715/222 |
| 2007/0250194 | A1 * | 10/2007 | Rhoads | G06Q 30/00 700/94 |
| 2008/0013757 | A1 * | 1/2008 | Carrier | G10H 1/0008 381/119 |
| 2008/0086318 | A1 * | 4/2008 | Gilley | G06Q 10/06 705/319 |
| 2008/0181498 | A1 * | 7/2008 | Swenson | G09G 5/14 382/173 |
| 2008/0226086 | A1 * | 9/2008 | Kageyama | G10H 1/46 381/58 |
| 2008/0240454 | A1 * | 10/2008 | Henderson | G10H 1/0066 381/61 |
| 2009/0074206 | A1 * | 3/2009 | Bradford | H03G 3/32 381/103 |
| 2009/0074214 | A1 * | 3/2009 | Bradford | H04R 25/558 381/312 |
| 2009/0074216 | A1 * | 3/2009 | Bradford | H04R 25/554 381/315 |
| 2009/0076636 | A1 * | 3/2009 | Bradford | G10L 21/02 700/94 |
| 2009/0100988 | A1 * | 4/2009 | Villa | A63F 13/00 84/601 |
| 2009/0131152 | A1 * | 5/2009 | Busse | G07F 17/32 463/23 |
| 2009/0133090 | A1 * | 5/2009 | Busse | H04N 7/163 725/132 |
| 2009/0178546 | A1 * | 7/2009 | Watanabe | G10H 1/0091 84/626 |
| 2009/0241759 | A1 * | 10/2009 | Natsume | G10H 1/0558 84/633 |
| 2009/0282967 | A1 * | 11/2009 | Skillings | G10H 1/0058 84/742 |
| 2009/0292681 | A1 * | 11/2009 | Wood | G06F 17/30864 |
| 2010/0119084 | A1 * | 5/2010 | Mussel | H04H 60/04 381/119 |
| 2010/0129063 | A1 | 5/2010 | Lee | |
| 2010/0166222 | A1 * | 7/2010 | Bongiovi | G10L 21/0208 381/103 |
| 2010/0180224 | A1 * | 7/2010 | Willard | G10H 1/0025 715/773 |
| 2010/0195840 | A1 * | 8/2010 | Ciccone | G10H 1/0091 381/61 |
| 2010/0251094 | A1 * | 9/2010 | Holm | G06F 17/30867 715/230 |
| 2011/0113011 | A1 * | 5/2011 | Prorock | G11B 27/36 707/634 |
| 2011/0125904 | A1 * | 5/2011 | Branigan | G06F 17/30911 709/226 |
| 2011/0144981 | A1 * | 6/2011 | Salazar | G10H 1/366 704/207 |
| 2011/0154290 | A1 * | 6/2011 | Kelly | G06F 9/44505 717/110 |
| 2011/0222669 | A1 * | 9/2011 | Buriano | H04L 65/80 379/32.01 |
| 2011/0224811 | A1 * | 9/2011 | Lauwers | G06F 3/16 700/94 |
| 2012/0011558 | A1 * | 1/2012 | Maddali | G06Q 30/00 725/131 |
| 2012/0036549 | A1 * | 2/2012 | Patel | G06F 21/10 725/153 |
| 2012/0059492 | A1 * | 3/2012 | Radford | H04H 60/04 700/94 |
| 2012/0063614 | A1 * | 3/2012 | Crockett | G11B 20/10527 381/98 |
| 2012/0130516 | A1 * | 5/2012 | Reinsch | G06F 17/00 700/94 |
| 2012/0165965 | A1 * | 6/2012 | Robinson | G11B 27/11 700/94 |
| 2012/0186418 | A1 * | 7/2012 | Chen | G10H 1/0091 84/626 |
| 2012/0210216 | A1 * | 8/2012 | Hurst | H04N 5/783 715/716 |
| 2012/0213375 | A1 * | 8/2012 | Mahabub | H04S 5/00 381/17 |
| 2012/0284622 | A1 * | 11/2012 | Avery | G06F 3/0488 715/719 |
| 2012/0294457 | A1 * | 11/2012 | Chapman | G10H 1/0091 381/98 |
| 2012/0331168 | A1 * | 12/2012 | Chen | H04L 67/1097 709/231 |
| 2013/0039632 | A1 * | 2/2013 | Feinson | H04N 5/77 386/223 |
| 2013/0148823 | A1 * | 6/2013 | Bongiovi | H04S 7/307 381/103 |
| 2013/0167027 | A1 * | 6/2013 | Adolph | H04N 21/439 715/716 |
| 2013/0263721 | A1 * | 10/2013 | Shavit | G10H 1/055 84/626 |
| 2013/0331970 | A1 * | 12/2013 | Beckhardt | G06F 3/165 700/94 |

(56) References Cited

U.S. PATENT DOCUMENTS

| | | | |
|---|---|---|---|
| 2013/0337789 A1* | 12/2013 | Johnson | H04W 4/02 455/414.1 |
| 2014/0150630 A1* | 6/2014 | Juszkiewicz | G10H 1/44 84/626 |
| 2014/0176298 A1* | 6/2014 | Kumar | H04L 12/4625 340/4.42 |
| 2014/0176299 A1* | 6/2014 | Kumar | G06F 3/165 340/4.42 |
| 2014/0177870 A1* | 6/2014 | Bongiovi | H04S 7/307 381/98 |
| 2014/0181199 A1* | 6/2014 | Kumar | H04W 4/043 709/204 |
| 2014/0181654 A1* | 6/2014 | Kumar | H04N 21/4126 715/716 |
| 2014/0181655 A1* | 6/2014 | Kumar | G06F 3/165 715/716 |
| 2014/0181656 A1* | 6/2014 | Kumar | H04L 12/6418 715/716 |
| 2014/0181659 A1* | 6/2014 | Kumar | H04N 21/44222 715/716 |
| 2014/0181997 A1* | 6/2014 | Kumar | H04W 12/00 726/29 |
| 2014/0195025 A1* | 7/2014 | Wieder | G06F 21/10 700/94 |
| 2014/0274353 A1* | 9/2014 | Benson | G06F 3/01 463/29 |
| 2014/0281984 A1* | 9/2014 | Milne | G06F 17/30778 715/716 |
| 2014/0289630 A1* | 9/2014 | Duwenhorst | G11B 27/00 715/727 |
| 2014/0311322 A1* | 10/2014 | De La Gorce | G10H 1/0008 84/626 |
| 2014/0342660 A1* | 11/2014 | Fullam | H04N 7/181 455/3.06 |
| 2014/0347565 A1* | 11/2014 | Fullam | H04N 5/607 348/738 |
| 2014/0373011 A1* | 12/2014 | Anderson | G06F 9/45533 718/1 |
| 2015/0063577 A1* | 3/2015 | Song | G10H 1/0091 381/61 |
| 2015/0095459 A1* | 4/2015 | Schulert | H04N 21/41407 709/219 |
| 2015/0262566 A1* | 9/2015 | Ceccolini | G10H 1/348 84/746 |
| 2016/0182513 A1* | 6/2016 | Pollock | H04L 63/10 726/3 |
| 2016/0366518 A1* | 12/2016 | Strogis | H04S 7/306 |
| 2017/0232326 A1* | 8/2017 | Gilley | G06F 19/3418 482/4 |

FOREIGN PATENT DOCUMENTS

| | | |
|---|---|---|
| CN | 103177737 A | 6/2013 |
| CN | 103646656 A | 3/2014 |
| EP | 1118998 A1 | 7/2001 |
| JP | 2006268936 A | 10/2006 |

\* cited by examiner

SOUND EFFECT PROCESSING METHOD AND DEVICE, PLUG-IN UNIT MANAGER AND SOUND EFFECT PLUG-IN UNIT

CROSS REFERENCE TO RELATED APPLICATION

The present disclosure is a continuation of International Application No. PCT/CN2014/090826, filed on Nov. 11, 2014, which claims priority to Chinese Patent Application No. 201310633280.5, titled "SOUND EFFECT PROCESSING METHOD AND DEVICE, PLUG-IN MANAGER AND SOUND EFFECT PLUG-IN", filed on Nov. 29, 2013 with the State Intellectual Property Office of the People's Republic of China, both of which are hereby incorporated by reference in their entireties.

TECHNICAL FIELD

The present disclosure relates to the field of information processing technology, and in particular, to a sound effect processing method, a sound effect processing device, a plug-in manager and a sound effect plug-in.

BACKGROUND

With the continuous development of information processing technology, demand for data processing is growing rapidly, and more and more data processing methods have arisen. In order to obtain plentiful playing effects, sound effect processing usually needs to be performed on media data. In a process of sound effect processing, the media data is usually processed to obtain a desired effect. A problem which draws people's attention is how to perform sound effect processing conveniently and quickly.

At present, there are two sound effect processing methods. The first method includes: installing an audio card having a sound effect processing function, loading and installing a driver applicable to the audio card and the current operating system, accessing a sound effect function page of the installed driver, and adjusting a parameter or a switch manually to activate the sound effect and accomplish the sound effect processing. The second method includes: in an IDE (Integrated Development Environment), adding sound effect codes to codes of a sound effect processing program, where the sound effect codes are configured to display on a user interface controls for obtaining a sound effect processing parameter and performing the sound effect processing based on the obtained sound effect processing parameter; compiling, by a code compiler corresponding to the IDE, codes of the sound effect processing program with the added sound effect codes, into object codes which can be executed in the IDE, so as to generate an executable program; and running the executable program, obtaining the sound effect processing parameter via the displayed controls, and performing the sound effect processing by the executable program based on the obtained sound effect processing parameter.

However, in the first method, an audio card, which is applicable to the current operating system and has a sound effect processing function, needs to be installed, and thus the cost of the sound effect processing is increased. Moreover, since the installed driver needs to be applicable to the current operating system, the same driver can not be applied to different operating systems, thus limiting an application scope of this sound effect processing. Furthermore, other applications usually need to process the original data. However, after original data to be processed is preprocessed by the audio card, data with a sound effect is output. As a result, the original data can not be processed by other applications any more. Thus the application scope of the first sound effect processing method has some limitations.

In the second method, for different sound effect processing programs, the processes of adding sound effect codes to codes of different sound effect processing programs and re-compiling codes need to be executed repeatedly, which results in a high cost of the sound effect processing. In addition, since different IDEs correspond to different code compilers, a compilation failure may occur when the same sound effect code is complied in different IDEs, which further increases the cost of the sound effect processing.

SUMMARY

In view of the above, a sound effect processing method and device, a plug-in manager and a sound effect plug-in are provided according to embodiments of the present disclosure. Specific technical solutions are described as follows.

In an aspect, a sound effect processing method is provided, which includes:

invoking a pre-loaded plug-in manager to obtain a sound effect processing parameter supported by each pre-loaded sound effect plug-in, where the number of the sound effect plug-in is at least one;

obtaining a sound effect configuration file pre-configured by the plug-in manager, where the sound effect configuration file includes parameter control data in at least one sound effect mode and a sound effect index identifier corresponding to a respective sound effect mode;

displaying the sound effect index identifier corresponding to the respective sound effect mode, and determining one displayed sound effect index identifier as a selected sound effect index identifier;

determining a selected sound effect mode based on the selected sound effect index identifier, displaying an adjustment interface of the parameter control data in the selected sound effect mode, and obtaining adjusted parameter control data from the displayed adjustment interface;

invoking the plug-in manager to select a sound effect plug-in based on the sound effect processing parameter supported by each sound effect plug-in, and sending the adjusted parameter control data to the selected sound effect plug-in; and invoking the plug-in manager to send data to be processed to the selected sound effect plug-in, and performing, by the selected sound effect plug-in, the sound effect processing on the data to be processed, based on the adjusted parameter control data.

In another aspect, a sound effect processing device is provided, which includes:

a first invoking module, configure to invoke a pre-loaded plug-in manager to obtain a sound effect processing parameter supported by each pre-loaded sound effect plug-in, where the number of the sound effect plug-in is at least one;

a first obtaining module, configured to obtain a sound effect configuration file pre-configured by the plug-in manager, where the sound effect configuration file includes parameter control data in at least one sound effect mode and a sound effect index identifier corresponding to a respective sound effect mode;

a first displaying module, configured to display the sound effect index identifier corresponding to the respective sound effect mode;

a first determining module, configured to determine one displayed sound effect index identifier as a selected sound effect index identifier;

a second determining module, configured to determine a selected sound effect mode based on the selected sound effect index identifier;

a second displaying module, configured to display an adjustment interface of the parameter control data in the selected sound effect mode;

a second obtaining module, configured to obtain adjusted parameter control data from the displayed adjustment interface;

a second invoking module, configured to invoke the plug-in manager to select a sound effect plug-in based on the sound effect processing parameter supported by each sound effect plug-in, and to send the adjusted parameter control data to the selected sound effect plug-in; and a third invoking module, configured to invoke the plug-in manager to send data to be processed to the selected sound effect plug-in, and to perform by the selected sound effect plug-in the sound effect processing on the data to be processed based on the adjusted parameter control data.

A plug-in manager is further provided, which includes:

a first obtaining module, configured to obtain a sound effect processing parameter supported by each pre-loaded sound effect plug-in, where the number of the sound effect plug-in is at least one;

a selecting module, configured to select a sound effect plug-in, based on the sound effect processing parameter supported by each sound effect plug-in;

a second obtaining module, configured to obtain adjusted parameter control data;

a first sending module, configured to send the adjusted parameter control data to the selected sound effect plug-in; and a second sending module, configured to send data to be processed to the selected sound effect plug-in, and to perform by the selected sound effect plug-in sound effect processing on the data to be processed based on the adjusted parameter control data.

A sound effect plug-in is further provided, which includes:

a sending module, configured to send a supported sound effect processing parameter to a plug-in manager, and to select by the plug-in manager a sound effect plug-in for processing data to be processed, based on the received sound effect processing parameter supported by at least one sound effect plug-in;

a first receiving module, configured to receive the data to be processed sent by the plug-in manager;

a second receiving module, configured to receive adjusted parameter control data sent by the plug-in manager; and a processing module, configured to perform sound effect processing on the data to be processed based on the adjusted parameter control data.

By invoking the pre-loaded plug-in manager, the pre-configured sound effect configuration file is obtained. After the adjustment interface of the parameter control data in the selected sound effect mode, which is included in the sound effect configuration file, is displayed, the adjusted parameter control data is obtained. The plug-in manager is invoked to send the adjusted parameter control data to the sound effect plug-in that supports the sound effect processing parameter. And the data to be processed is processed by the sound effect plug-in based on the adjusted parameter control data. In this way, the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded.

BRIEF DESCRIPTION OF THE DRAWINGS

In order to illustrate technical solutions of embodiments of the present disclosure more clearly, drawings used in the description of the embodiments are introduced briefly hereinafter. Apparently, the drawings described herein merely show some embodiments of the present disclosure, and other drawings can be obtained by those skilled in the art based on these drawings shown herein without any inventive efforts.

DETAILED DESCRIPTION OF THE EMBODIMENTS

In order to make the object, the technical solutions and the advantages of the present disclosure more clear, the present disclosure will be further described in detail hereinafter in conjunction with the drawings.

Figure 1:
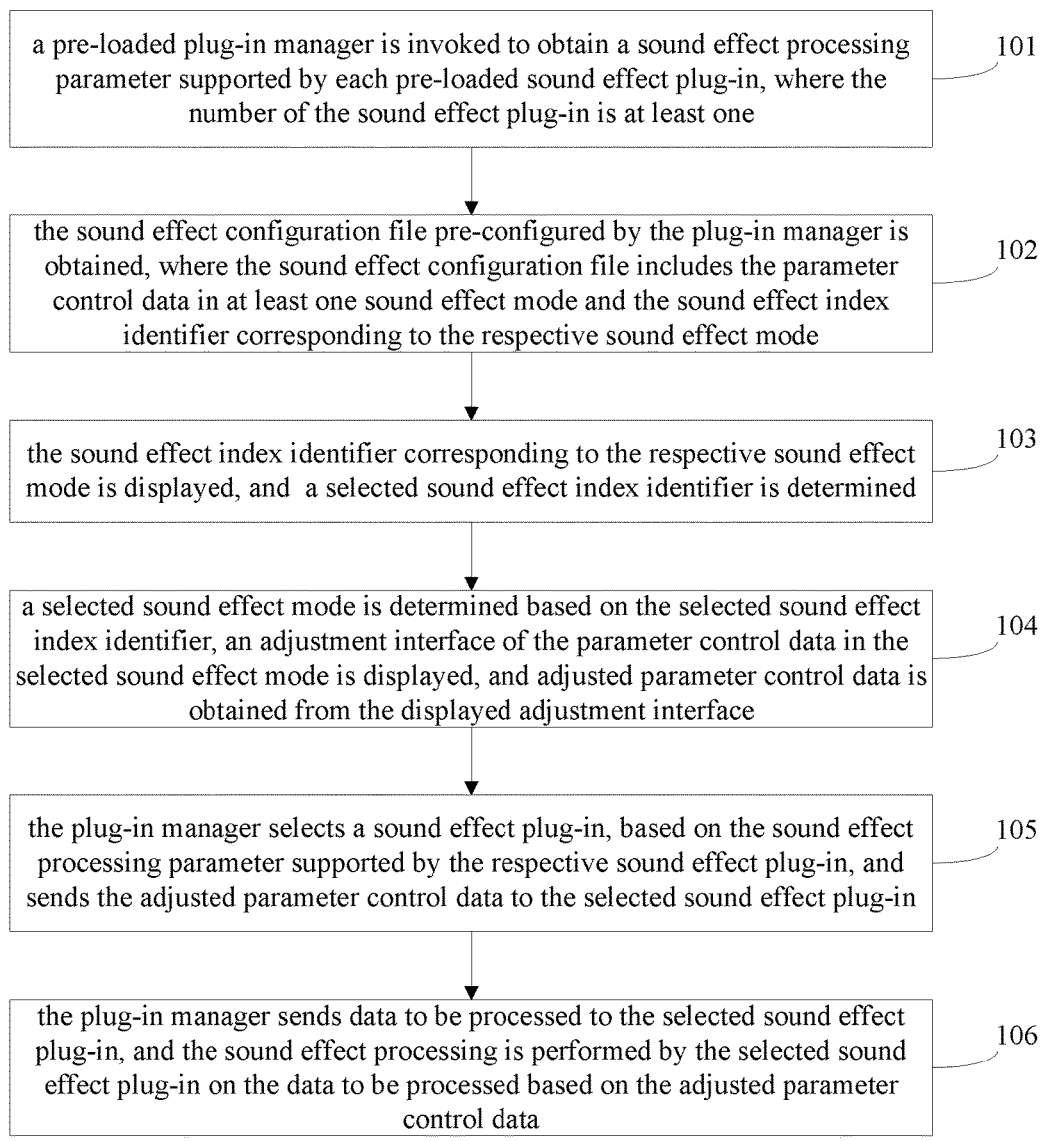
FIG. 1 is a flow chart of a sound effect processing method according to an embodiment of the present disclosure.

A sound effect processing method is provided according to an embodiment of the present disclosure. Referring to FIG. 1, a workflow of the method includes steps 101 to 106.

In step 101, a pre-loaded plug-in manager is invoked to obtain a sound effect processing parameter supported by each pre-loaded sound effect plug-in. The number of the sound effect plug-in is at least one.

Further, before the pre-loaded plug-in manager is invoked to obtain the sound effect processing parameter supported by each pre-loaded sound effect plug-in, the method includes:

loading the plug-in manager and at least one sound effect plug-in.

Further, the plug-in manager is compiled to be a corresponding dynamic library file, and each sound effect plug-in is compiled to be a corresponding dynamic library file; and loading the plug-in manager and at least one sound effect plug-in includes:

loading the dynamic library file corresponding to the plug-in manager and the dynamic library file corresponding to the respective sound effect plug-in.

Further, before the pre-loaded plug-in manager is invoked to obtain the sound effect processing parameter supported by each pre-loaded sound effect plug-in, the method includes:

invoking the plug-in manager to configure the sound effect processing parameter supported by each loaded sound effect plug-in, determining parameter control data in a sound effect mode corresponding to the respective sound effect plug-in based on the sound effect processing parameter supported by each sound effect plug-in, and setting a sound effect index identifier corresponding to the respective sound effect mode; and determining the parameter control data in the respective sound effect mode and the sound effect index identifier corresponding to the respective sound effect mode as a configuration result to be written into a sound effect configuration file, and storing the sound effect configuration file.

Further, after the plug-in manager is invoked to determine the parameter control data in the respective sound effect mode and the sound effect index identifier corresponding to the respective sound effect mode as the configuration result to be written into the sound effect configuration file, the method includes:

updating the configuration result in the sound effect configuration file configured by the plug-in manager, and invoking the plug-in manager to store the updated sound effect configuration file.

In step 102, the sound effect configuration file pre-configured by the plug-in manager is obtained, where the sound effect configuration file includes the parameter control data in at least one sound effect mode and the sound effect index identifier corresponding to the respective sound effect mode.

In step 103, the sound effect index identifier corresponding to the respective sound effect mode is displayed, and one displayed sound effect index identifier is determined as a selected sound effect index identifier.

In step 104, a selected sound effect mode is determined based on the selected sound effect index identifier, an adjustment interface of the parameter control data in the selected sound effect mode is displayed, and adjusted parameter control data is obtained from the displayed adjustment interface.

In step 105, the plug-in manager is invoked to select a sound effect plug-in, based on the sound effect processing parameter supported by the respective sound effect plug-in, and the adjusted parameter control data is sent to the selected sound effect plug-in.

In step 106, the plug-in manager is invoked to send data to be processed to the selected sound effect plug-in, and the sound effect processing is performed by the selected sound effect plug-in on the data to be processed based on the adjusted parameter control data.

Based on the sound effect processing method according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

Figure 2:
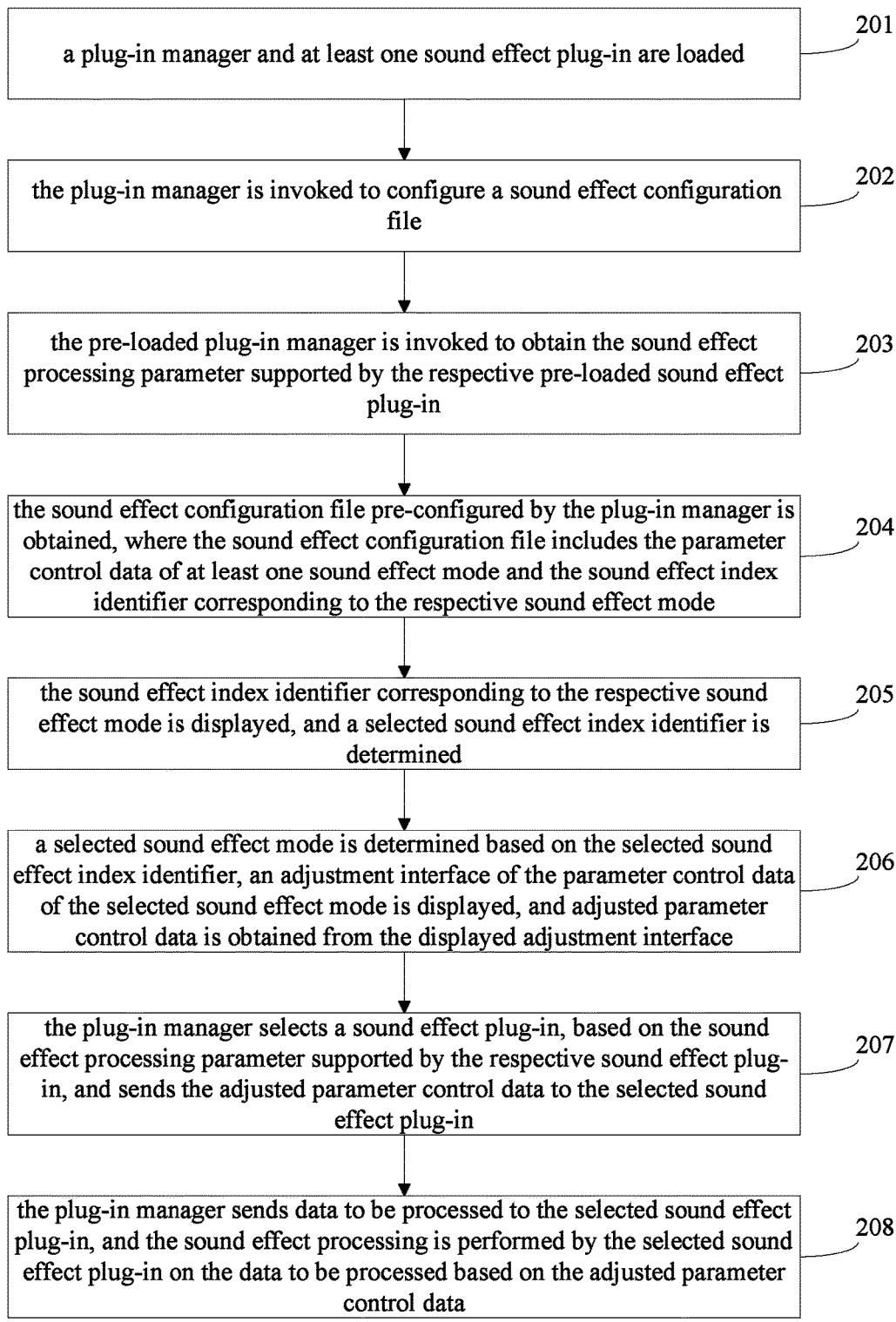
FIG. 2 is a flow chart of a sound effect processing method according to another embodiment of the present disclosure.

A sound effect processing method is provided according to another embodiment of the present disclosure. The sound effect processing method according to this embodiment of the present disclosure will be described in detail with reference with what was described for the above embodiment. Referring to FIG. 2, a workflow of the method according to the present embodiment includes steps 201 to 208.

In step 201, a plug-in manager and at least one sound effect plug-in are loaded.

For this step, a specific structure of the plug-in manager and a specific structure of the sound effect plug-in can be found in the disclosure below, and will not be described herein. In order that the loaded plug-in manager and the sound effect plug-in can be used for different sound effect processing programs, the plug-in manager may be compiled in advance to be a corresponding dynamic library file, and each sound effect plug-in may be compiled in advance to be a corresponding dynamic library file. In this way, when loading the plug-in manager and the at least one sound effect configuration file, only the dynamic library file corresponding to the plug-in manager and the dynamic library file corresponding to the respective sound effect plug-in need to be loaded, which not only avoids an operation of adding code but also reduces the cost of the sound effect processing. Moreover, the dynamic library file corresponding to the plug-in manager and the dynamic library file corresponding to the respective sound effect plug-in can be used for different operating systems, thus expanding the application scope of the sound effect processing. In a specific example, the dynamic library file corresponding to the plug-in manager and the dynamic library file corresponding to the respective sound effect plug-in may be complied and obtained via a compiler corresponding to the current operating system. It should be noted that different operating systems may need different compilers, and the binary contents and extensions of filename of the generated dynamic library files may be different for different operating systems.

It should be noted that after step 201 in which the plug-in manager and the at least one sound effect plug-in are loaded, a next step 202 may be executed directly when the method according to the embodiment of the present disclosure is performed for the next time, without the need for executing step 201 again. If the current operating system is changed, a compiler corresponding to the operating system after change is required to compile the plug-in manager to be a corresponding dynamic library file and to compile each sound effect plug-in to be a corresponding dynamic library file, thus dispensing with the need for executing step 201.

In step 202, the plug-in manager is invoked to configure a sound effect configuration file.

Specifically, the process of configuring the sound effect configuration file by the plug-in manager includes, but is not limited to: configuring a sound effect processing parameter supported by each sound effect plug-in loaded, determining parameter control data in a sound effect mode corresponding to the respective sound effect plug-in based on the sound effect processing parameter supported by each sound effect plug-in, and setting a sound effect index identifier corresponding to the respective sound effect mode; and determining the parameter control data in the respective sound effect mode and the sound effect index identifier corresponding to the respective sound effect mode as a configuration result to be written into the sound effect configuration file.

The sound effect processing parameter includes, but is not limited to: an audio format, such as sampling frequency, the number of channels, frame length and sampling depth.

One sound effect plug-in corresponds to one sound effect mode, and the parameter control data in the sound effect mode corresponding to one sound effect plug-in refers to a value range of the sound effect processing data supported by the sound effect plug-in, i.e., a value domain of the sound effect processing parameter. One sound effect mode corresponds to one sound effect index identifier. Therefore, in case of multiple sound effect modes, sound effect index identifiers corresponding to the sound effect modes may be used for searching for and loading the sound effect modes. Specific content of the sound effect index identifier is not limited in this embodiment. In a specific example, in order to facilitate searching for and loading the sound effect mode, the name of the sound effect mode may be used as the specific content of the corresponding sound effect index identifier.

Of course, in addition to the above specific content of the sound effect index identifier, other contents may be used as the specific corresponding content of the sound effect index identifier.

In an embodiment, in the process of configuring the sound effect configuration file by the plug-in manager, a set of specific values of the parameter control data in the sound effect mode corresponding to the sound effect plug-in may be obtained for each sound effect plug-in by debugging, and can be used as default values of the parameter control data.

In addition, after the parameter control data in the respective sound effect mode and the sound effect index identifier corresponding to the respective sound effect mode are determined as the configuration result and the configuration result is then written into the sound effect configuration file, the configuration of the sound effect configuration file is completed. The configured sound effect configuration file may be directly applied to different sound effect processing programs so as to achieve the same sound effect processing effect, without the need for configuring the sound effect configuration file again. In order that other sound effect processing programs can directly use or update the configured sound effect configuration file, a process of invoking the plug-in manager to configure the sound effect configuration file in the method according to the embodiment of the present disclosure includes, but is not limited to: invoking the plug-in manager to store the sound effect configuration file. A storage location of the sound effect configuration file is not limited herein. In a specific example, the sound effect configuration file can be locally stored in a memory of the plug-in manager, or can be stored in other locations such as a cloud memory.

In order to facilitate understanding, an example in which three sound effect plug-ins are pre-loaded will be described. The three sound effect plug-ins are plug-in 1, plug-in 2 and plug-in 3, respectively. The plug-in 1 corresponds to sound effect mode 1, the plug-in 2 corresponds to sound effect mode 2, and the plug-in 3 corresponds to sound effect mode 3. Sound effect processing parameters supported by the plug-in 1 are configured to be parameter 11, parameter 12 and parameter 13. Sound effect processing parameters supported by the plug-in 2 are configured to be parameter 21, parameter 22 and parameter 23. Sound effect processing parameters supported by the plug-in 3 are configured to be parameter 31, parameter 32 and parameter 33. Value ranges of the parameter 11, the parameter 12 and the parameter 13 are determined to be from 110 to 119, from 120 to 129 and from 130 to 139, respectively. Value ranges of the parameter 21, the parameter 22 and the parameter 23 are determined to be from 210 to 219, from 220 to 229 and from 230 to 239, respectively. Value ranges of the parameter 31, the parameter 32 and the parameter 33 are determined to be from 310 to 319, from 320 to 329 and from 330 to 339, respectively. A sound effect index identifier corresponding to the sound effect mode 1 is set to be sound effect 1. A sound effect index identifier corresponding to the sound effect mode 2 is set to be sound effect 2. A sound effect index identifier corresponding to the sound effect mode 3 is set to be sound effect 3. The sound effect processing parameters and the sound effect index identifiers described above are written into the sound effect configuration file, and the sound effect configuration file is stored locally.

Further, after the parameter control data in the respective sound effect mode and the sound effect index identifier corresponding to the respective sound effect mode are determined as the configuration result and the configuration result is written into the sound effect configuration file, the method further includes, but is not limited to: updating the configuration result in the sound effect configuration file configured by the plug-in manager, and invoking the plug-in manager to store the updated sound effect configuration file. For the process of updating the configuration result of the sound effect configuration file configured by the plug-in manager, reference can be made to the above process of configuring the sound effect configuration file by the plug-in manager, and no repeated discussion is provided herein. By updating the configuration result of the sound effect configuration file configured by the plug-in manager, a sound effect is modified without the need for compiling codes again.

It should be noted that, after step 202 in which the plug-in manager is invoked to configure the sound effect configuration file, a next step 203 may be executed directly when the method according to the embodiment of the present disclosure is performed for the next time, without the need for executing step 202 again. If an operation such as modifying sound effect is required, the configuration result in the sound effect configuration file configured by the plug-in manager needs to be updated, thus step 202 needs to be performed again.

In step 203, the pre-loaded plug-in manager is invoked to obtain the sound effect processing parameter supported by the respective pre-loaded sound effect plug-in.

For this step, the way how the plug-in manager obtains the sound effect processing parameter supported by the respective pre-loaded sound effect plug-in is not limited herein. In a specific example, the plug-in manager may send a message for obtaining the sound effect processing parameter to the respective pre-loaded sound effect plug-in, and the respective pre-loaded sound effect plug-in, after receiving the message for obtaining the sound effect processing parameter, sends the sound effect processing parameter supported by the respective plug-in manager to the plug-in manager respectively.

In addition, while obtaining the sound effect processing parameter supported by the respective pre-loaded sound effect plug-in, the plug-in manager may also obtain information, such as the number, name, unit and value domain of the sound effect processing parameter supported by the respective pre-loaded sound effect plug-in. Since one sound effect plug-in corresponds to one sound effect mode, information such as the number and name of the sound effect mode corresponding to the respective pre-loaded sound effect plug-in may be also obtained.

The way of invoking the pre-loaded plug-in manager is also not limited herein. In a specific example, the way of invoking includes, but is not limited to: sending invoking information to the plug-in manager so as to invoke the pre-loaded plug-in manager.

In step 204, the sound effect configuration file pre-configured by the plug-in manager is obtained. The sound effect configuration file includes the parameter control data of at least one sound effect mode and the sound effect index identifier corresponding to the respective sound effect mode.

For this step, since the plug-in manager has already been invoked to configure the sound effect configuration file in the above step 202, the sound effect configuration file pre-configured by the plug-in manager may be obtained directly. In addition, since the parameter control data in the respective sound effect mode and the sound effect index identifier corresponding to the respective sound effect mode are determined as the configuration result in the process of configuring the sound effect configuration file, and the configuration result is written into the sound effect configuration file, the obtained sound effect configuration file configured in advance includes the parameter control data of at least one sound effect mode and the sound effect index identifier corresponding to the respective sound effect mode.

In step 205, the sound effect index identifier corresponding to the respective sound effect mode is displayed, and one displayed sound effect index identifier is determined as a selected sound effect index identifier.

For this step, the way of displaying the sound effect index identifier corresponding to the respective sound effect mode is not limited herein.

Further, since the sound effect index identifier corresponding to the respective sound effect mode is displayed, the selected sound effect index identifier can be determined by detecting which sound effect index identifier is selected. The way of detecting the selected sound effect index identifier is not limited herein. In a specific example, after the sound effect index identifier corresponding to the respective sound effect mode is displayed, a user may select a sound effect index identifier with a click operation of a mouse. Therefore, detecting the selected sound effect index identifier includes, but is not limited to: detecting a click operation of a mouse, and determining a sound effect index identifier clicked by the mouse as the selected sound effect index identifier. Of course, in addition to the above way of detecting the selected sound effect index identifier, other ways such as detecting an action of screen touch may also be used.

Figure 3:
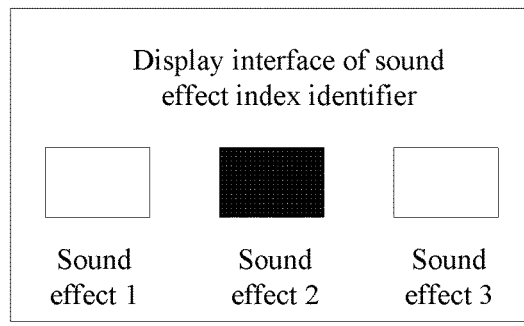
FIG. 3 is a schematic diagram of a display interface of a sound effect index identifier provided in an embodiment of the present disclosure.

In order to facilitate understanding, a display interface of the sound effect index identifiers illustrated in FIG. 3 will be described as an example. Three sound effect index identifiers, i.e., sound effect 1, sound effect 2 and sound effect 3, are displayed on the display interface of the sound effect index identifiers. It is detected that the sound effect 2 is selected, thus the sound effect 2 is determined as the selected sound effect index identifier.

In step 206, a selected sound effect mode is determined based on the selected sound effect index identifier, an adjustment interface of the parameter control data of the selected sound effect mode is displayed, and adjusted parameter control data is obtained from the displayed adjustment interface.

For this step, since one sound effect mode corresponds to one sound effect index identifier in the pre-configured sound effect configuration file, the sound effect mode corresponding to the selected sound effect index identifier can be searched for in the obtained sound effect configuration file and the obtained sound effect mode is determined as the selected sound effect mode.

Further, after the selected sound effect mode is determined, the adjustment interface of the parameter control data in the selected sound effect mode may also be displayed. The adjustment interface may provide an adjustment operation on the parameter control data for the user. A specific form of the adjustment interface of the parameter control data is not limited herein. In a specific example, the sound effect processing parameter and the parameter control data may be displayed on the adjustment interface of the parameter control data, and an adjustment button can be also displayed. The user may adjust the parameter control data by operating the adjustment button.

Of course, in addition to the above specific form of the adjustment interface of the parameter control data, the adjustment interface of the parameter control data may be also displayed in other forms.

In an embodiment, when the adjustment interface of the parameter control data in the selected sound effect mode is displayed, a default value of the parameter control data in the selected sound effect mode may be also displayed so that the selected sound effect mode can be achieved without the need of adjusting the parameter control data.

In order to obtain more plentiful sound effect processing effects, the method according to the embodiment of the present disclosure further includes a step of obtaining the adjusted parameter control data from the displayed adjustment interface of the parameter control data in the selected sound effect mode. The adjusted parameter control data may be obtained by obtaining an adjusted position of the adjustment button, or by obtaining input parameter control data, or in other ways, with no specific limitation herein.

Figure 4:
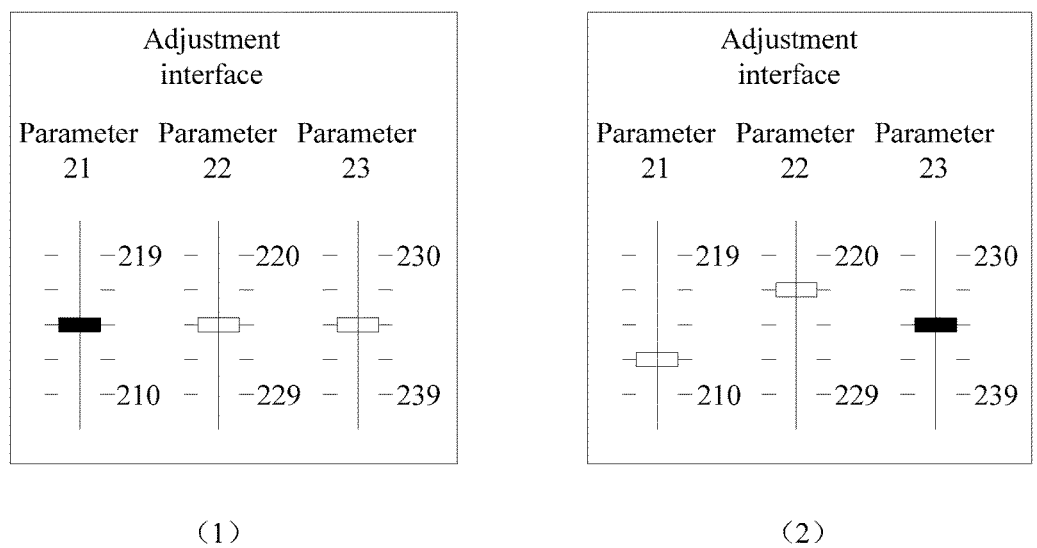
FIG. 4 is a schematic diagram of an adjustment interface provided in an embodiment of the present disclosure.

In order to facilitate understanding, an adjustment interface illustrated in FIG. 4 (1) will be described as an example. Sound effect 2 is determined to be the selected sound effect mode based on a selected sound effect identifier 2, and then sound effect processing parameters supported by sound effect 2 are displayed on the adjustment interface, i.e., parameter 21, parameter 22 and parameter 23. Value ranges of parameter 21, parameter 22 and parameter 23 are displayed, which are from 210 to 219, from 220 to 229 and from 230 to 239, respectively. Default values of parameter control data in sound effect 2 are displayed, that is, the value of parameter 21 is 214, the value of parameter 22 is 224, and the value of parameter 23 is 234. An adjustment button corresponding to the respective parameter is displayed on the adjustment interface, and the value of the parameter control data may be increased or reduced by adjusting the position of the adjustment button. The adjustment interface of adjusted parameter control data in the selected sound effect mode is illustrated in FIG. 4 (2). The adjusted position of the adjustment button is detected and is made to correspond to the value of one parameter control data, and the value is determined as the adjusted parameter control data.

In step 207, the plug-in manager is invoked to select a sound effect plug-in, based on the sound effect processing parameter supported by the respective sound effect plug-in, and the adjusted parameter control data is sent to the selected sound effect plug-in.

For this step, since the pre-loaded plug-in manager has been invoked to obtain the sound effect processing parameter supported by the respective pre-loaded sound effect plug-in, the plug-in manager may select a sound effect plug-in which supports the adjusted parameter control data, based on a correspondence between the sound effect plug-in and the sound effect processing parameter, and then send the adjusted parameter control data to the selected sound effect plug-in.

In step 208, the plug-in manager is invoked to send data to be processed to the selected sound effect plug-in, and the sound effect processing is performed by the selected sound effect plug-in on the data to be processed based on the adjusted parameter control data.

Specifically, the process of sending the data to be processed to the selected sound effect plug-in by the plug-in manager includes, but is not limited to: selecting, by the plug-in manager, a frame of digital signal of data to be processed from a queue of data to be processed that is stored temporarily and locally, and sending the selected digital signal to the selected sound effect plug-in. A length of the frame of digital signal is not limited herein, and may be set based on as required by actual applications.

Further, since the selected sound effect plug-in is selected based on the sound effect processing parameter supported by the respective sound effect plug-in, the selected sound effect plug-in can support the adjusted parameter control data corresponding to the sound effect processing parameter, and perform the sound effect processing on the data to be processed based on the adjusted parameter control data after receiving the data to be processed sent from the plug-in manager. A specific process is not limited herein, which includes, but is not limited to: performing signal processing on the data to be processed, based on the adjusted parameter control data, so as to enable the processed data to exhibit a corresponding sound effect when being played. In a specific example, the sound effect plug-in may include a digital signal processor so as to realize signal processing. The way of performing signal processing on the data using the digital signal processor is not limited herein. For details, reference can be made to conventional ways of signal processing.

With the sound effect processing method according to the embodiments of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

Figure 5:
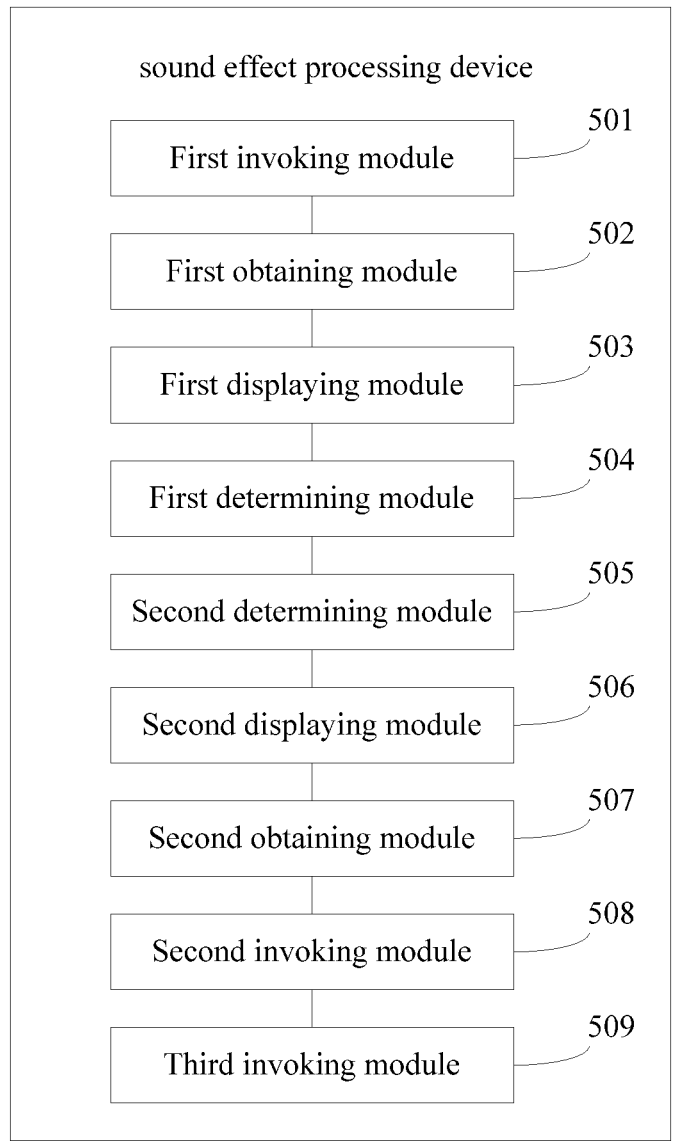
FIG. 5 is a schematic structural diagram of a sound effect processing device according to an embodiment of the present disclosure.

As shown in FIG. 5, a sound effect processing device is provided according to an embodiment of the present disclosure, which includes:

a first invoking module 501, configure to invoke a pre-loaded plug-in manager to obtain a sound effect processing parameter supported by a respective pre-loaded sound effect plug-in, where the number of the sound effect plug-in is at least one;

a first obtaining module 502, configured to obtain a sound effect configuration file pre-configured by the plug-in manager, where the sound effect configuration file includes parameter control data in at least one sound effect mode and a sound effect index identifier corresponding to a respective sound effect mode;

a first displaying module 503, configured to display the sound effect index identifier corresponding to the respective sound effect mode;

a first determining module 504, configured to determine one displayed sound effect index identifier as a selected sound effect index identifier;

a second determining module 505, configured to determine a selected sound effect mode based on the selected sound effect index identifier;

a second displaying module 506, configured to display an adjustment interface of the parameter control data in the selected sound effect mode;

a second obtaining module 507, configured to obtain adjusted parameter control data from the displayed adjustment interface;

a second invoking module 508, configured to invoke the plug-in manager to select a sound effect plug-in based on the sound effect processing parameter supported by the respective sound effect plug-in, and to send the adjusted parameter control data to the selected sound effect plug-in; and a third invoking module 509, configured to invoke the plug-in manager to send data to be processed to the selected sound effect plug-in so that the selected sound effect plug-in performs the sound effect processing on the data to be processed based on the adjusted parameter control data.

Figure 6:
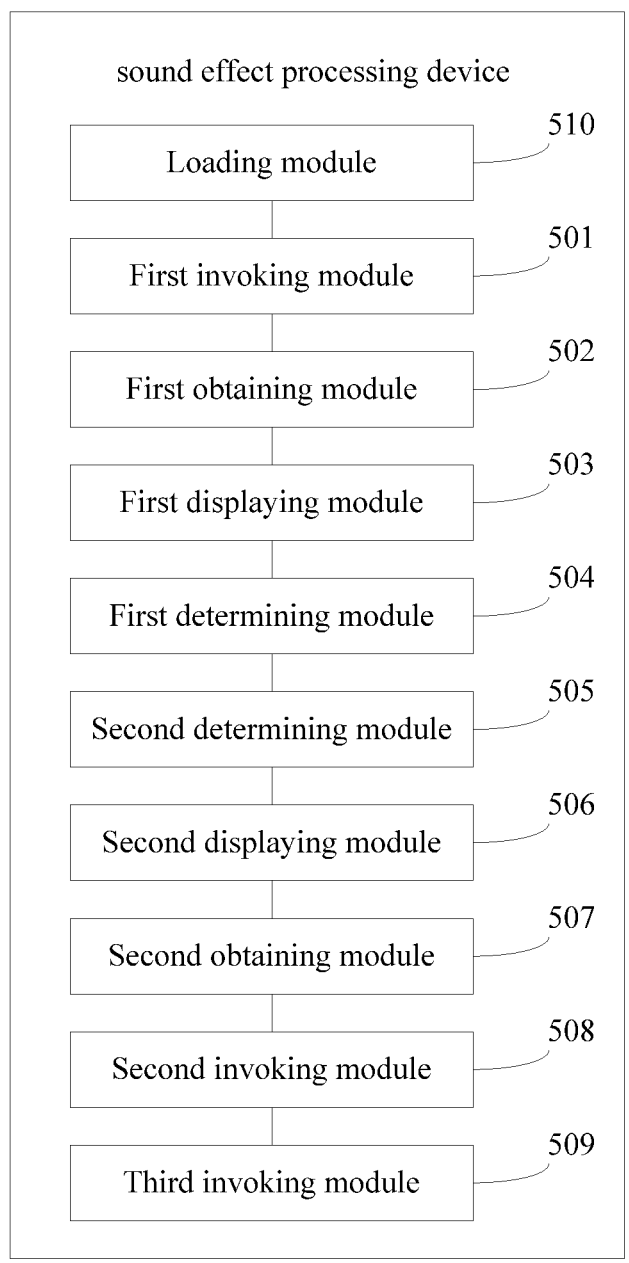
FIG. 6 is a schematic structural diagram of a sound effect processing device according to another embodiment of the present disclosure.

As shown in FIG. 6, in another embodiment, the device further includes:

a loading module 510, configured to load the plug-in manager and the at least one sound effect plug-in.

In an embodiment, the plug-in manager is compiled to be a corresponding dynamic library file, and each sound effect plug-in is compiled to be a corresponding dynamic library file; and the loading module 510 is configured to load the dynamic library file corresponding to the plug-in manager and the dynamic library file corresponding to the respective sound effect plug-in.

Figure 7:
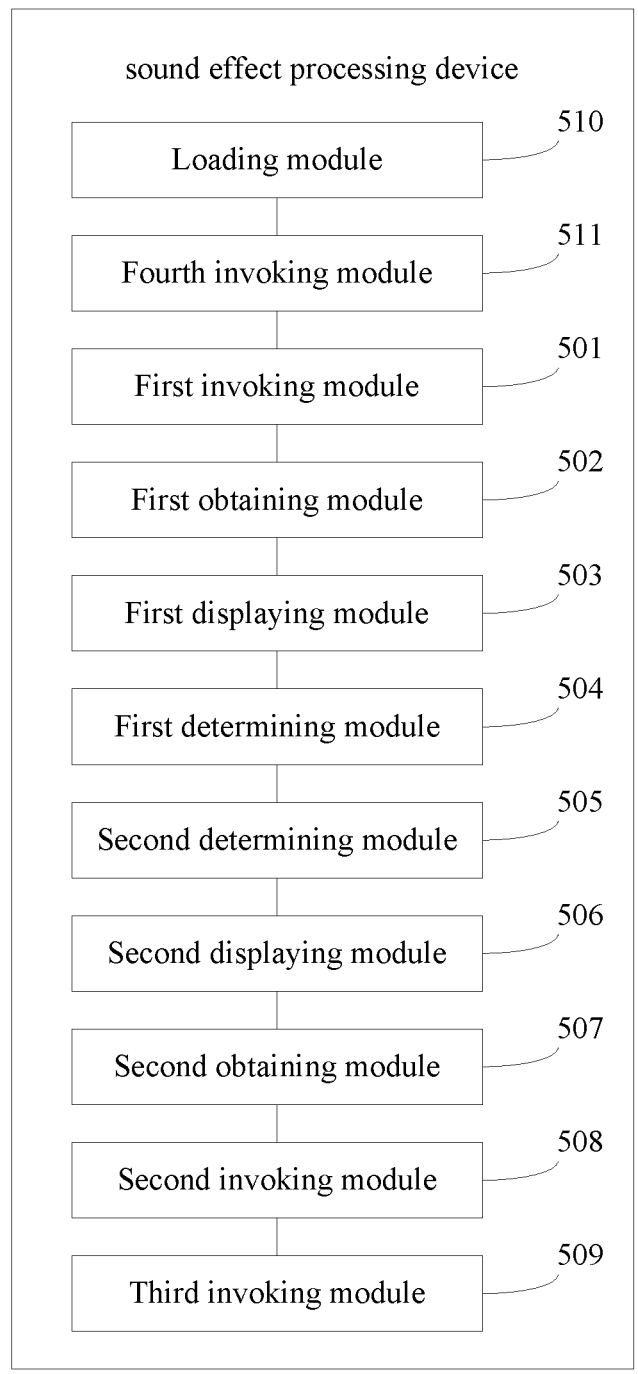
FIG. 7 is a schematic structural diagram of a sound effect processing device according to further another embodiment of the present disclosure.

As shown in FIG. 7, in another embodiment, the device further includes:

a fourth invoking module 511, configured to invoke the plug-in manager to configure the sound effect processing parameter supported by the respective sound effect plug-in loaded, to determine the parameter control data in the sound effect mode corresponding to the respective sound effect plug-in based on the sound effect processing parameter supported by the respective sound effect plug-in and set the sound effect index identifier corresponding to the respective sound effect mode, and to determine the parameter control data in the respective sound effect mode and the sound effect index identifier corresponding to the respective sound effect mode as a configuration result to be written into the sound effect configuration file, and to store the sound effect configuration file.

Figure 8:
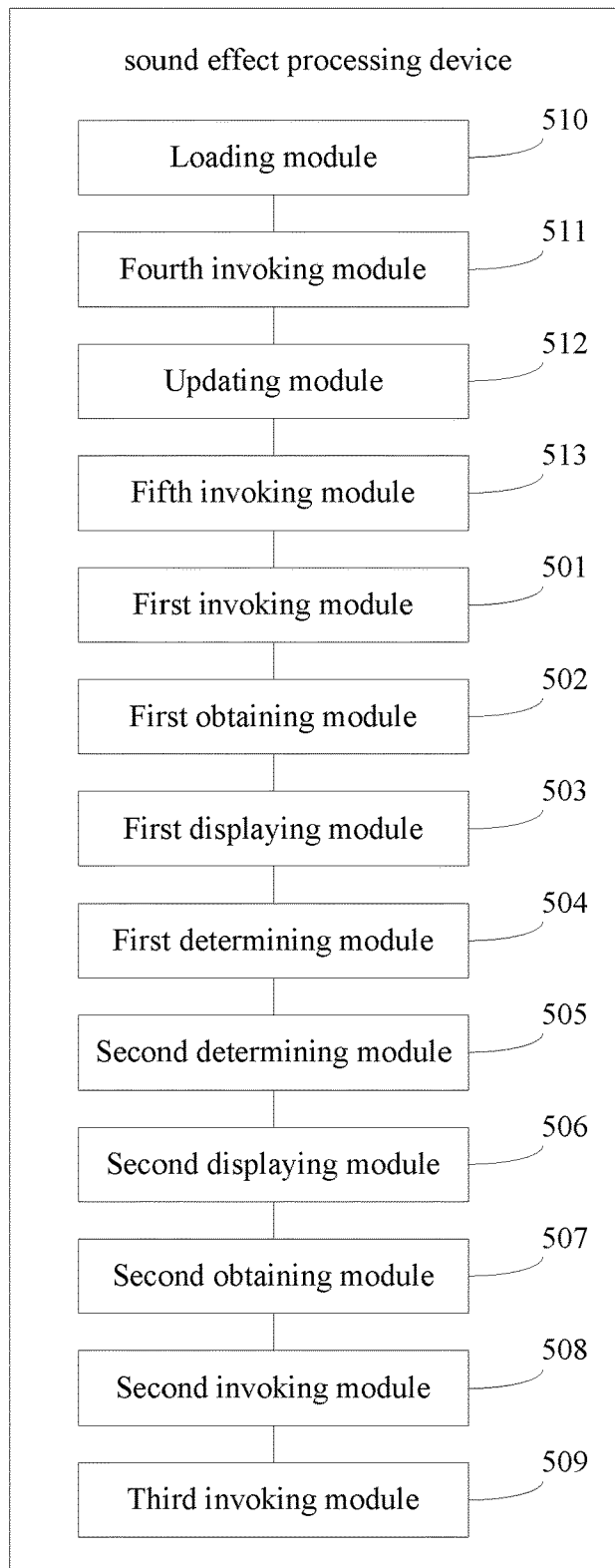
FIG. 8 is a schematic structural diagram of a sound effect processing device according to still further another embodiment of the present disclosure.

As shown in FIG. 8, in another embodiment, the device further includes:

an updating module 512, configured to update the configuration result in the sound effect configuration file configured by the plug-in manager; and a fifth invoking module 513, configured to invoke the plug-in manager to store the updated sound effect configuration file.

To sum up, with the sound effect processing devices according to the embodiments of the present disclosure, the data to be processed is processed by the sound effect plug-in based on the adjusted parameter control data so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

Figure 9:
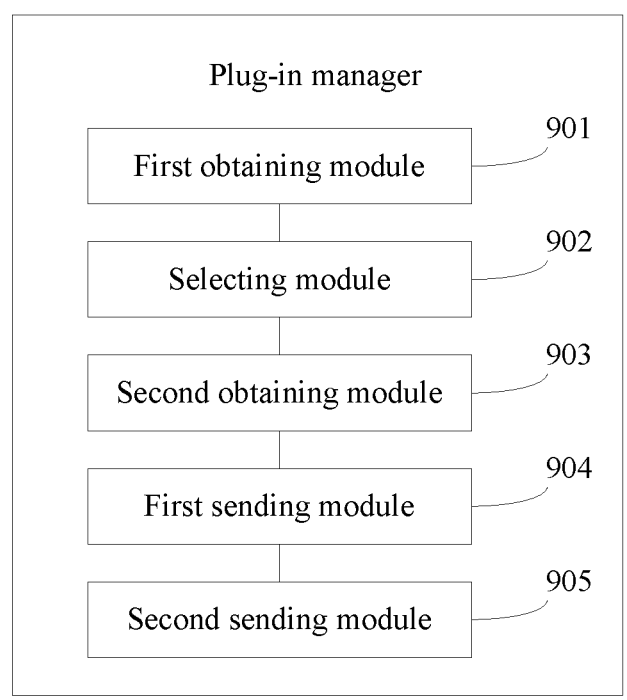
FIG. 9 is a schematic structural diagram of a plug-in manager according to an embodiment of the present disclosure.

As shown in FIG. 9, a plug-in manager is provided according to an embodiment of the present disclosure, which includes:

a first obtaining module 901, configured to obtain a sound effect processing parameter supported by a respective preloaded sound effect plug-in, where the number of the sound effect plug-in is at least one;

a selecting module 902, configured to select a sound effect plug-in based on the sound effect processing parameter supported by a respective sound effect plug-in;

a second obtaining module 903, configured to obtain adjusted parameter control data;

where the adjusted parameter control data may be obtained by a sound effect configuring device, and the adjusted parameter control data obtained by the sound effect configuring device is obtained by the second obtaining module 903. For the way in which the sound effect configuring device obtains the adjusted parameter control data, please refer to the specific steps in the method described above, which is not limited herein;

a first sending module 904, configured to send the adjusted parameter control data to the selected sound effect plug-in; and a second sending module 905, configured to send data to be processed to the selected sound effect plug-in so that the selected sound effect plug-in can perform sound effect processing on the data to be processed based on the adjusted parameter control data.

Figure 10:
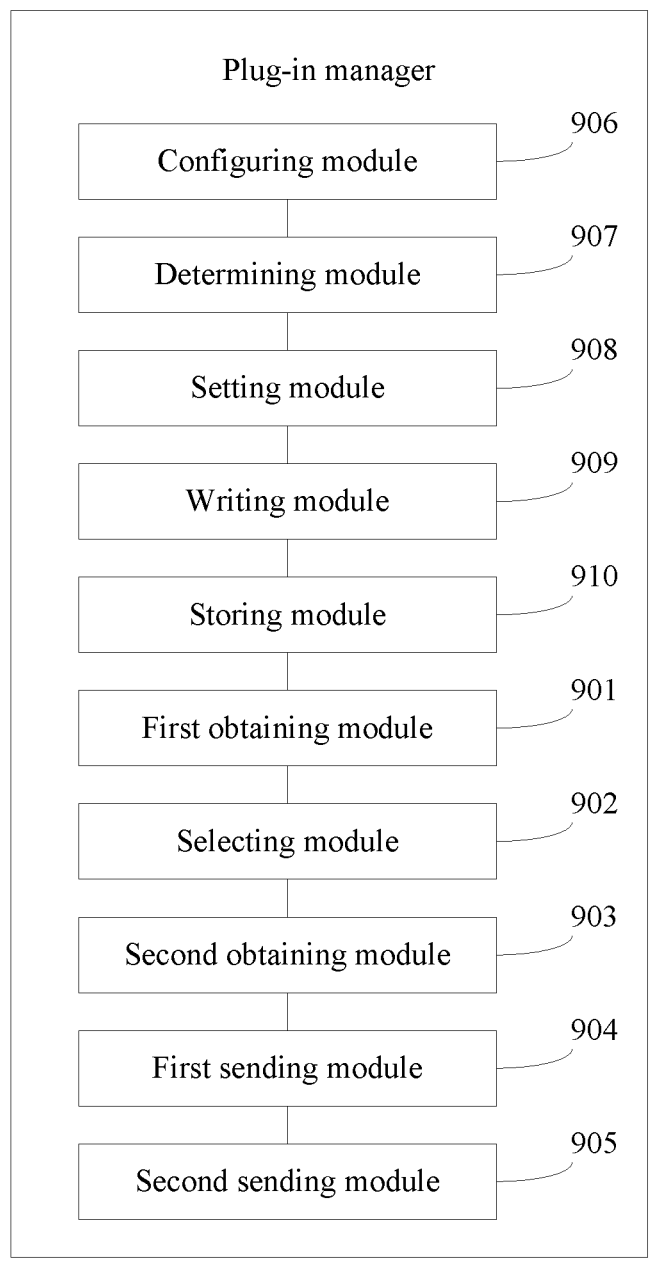
FIG. 10 is a schematic structural diagram of a plug-in manager according to another embodiment of the present disclosure.

As shown in FIG. 10, in another embodiment, the plug-in manager further includes:

a configuring module 906, configured to configure the sound effect processing parameter supported by a respective sound effect plug-in loaded;

a determining module 907, configured to determine parameter control data in a sound effect mode corresponding to the respective sound effect plug-in based on the sound effect processing parameter supported by the respective sound effect plug-in;

a setting module 908, configured to set a sound effect index identifier corresponding to a respective sound effect mode;

a writing module 909, configured to determine the parameter control data in the respective sound effect mode and the sound effect index identifier corresponding to the respective sound effect mode as a configuration result to be written into a sound effect configuration file; and a storing module 910, configured to store the sound effect configuration file.

Figure 11:
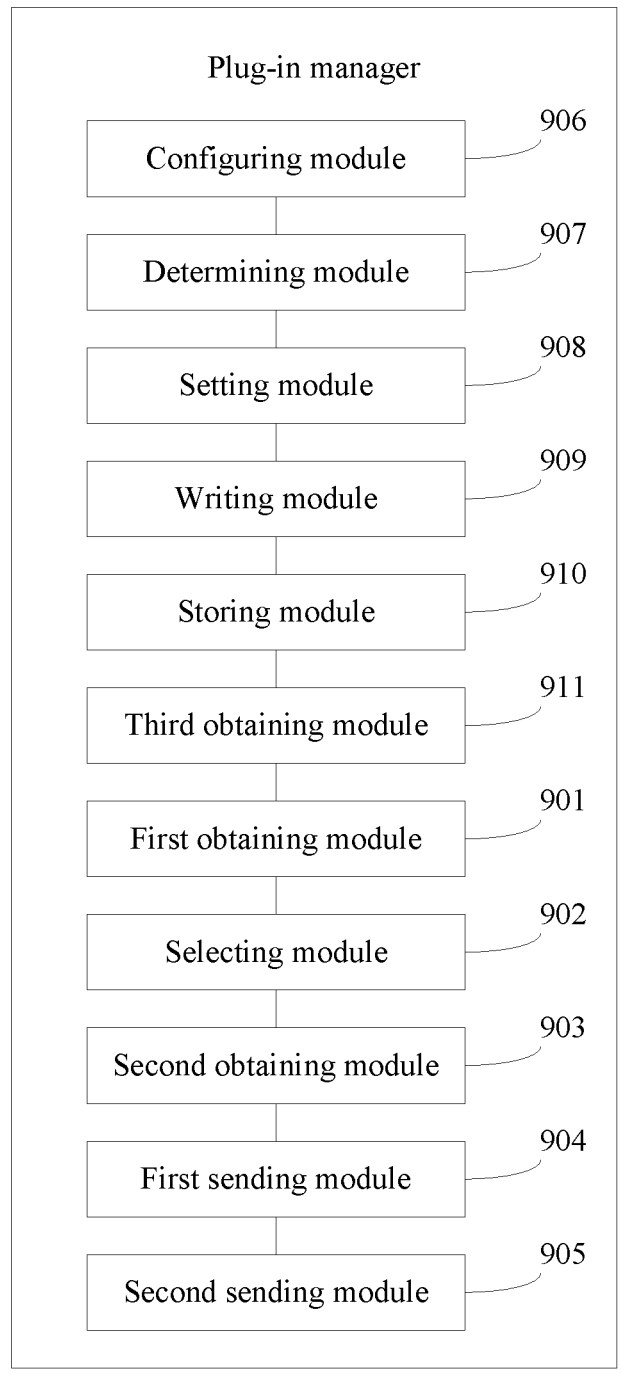
FIG. 11 is a schematic structural diagram of a plug-in manager according to further another embodiment of the present disclosure.

As shown in FIG. 11, in another embodiment, the plug-in manager further includes:

a third obtaining module 911, configured to obtain the updated sound effect configuration file; and the storing module 910 is further configured to store the updated sound effect configuration file.

Based on the plug-in manager according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

Figure 12:
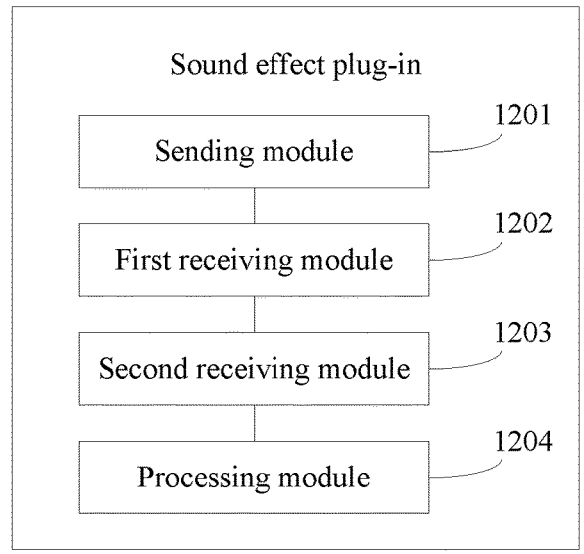
FIG. 12 is a schematic structural diagram of a sound effect plug-in according to an embodiment of the present disclosure.

As shown in FIG. 12, a sound effect plug-in is provided according to an embodiment of the present disclosure, which includes:

a sending module 1201, configured to send a supported sound effect processing parameter to a plug-in manager so that the plug-in manager can select a sound effect plug-in for processing data to be processed based on the received sound effect processing parameter supported by at least one sound effect plug-in;

a first receiving module 1202, configured to receive the data to be processed sent by the plug-in manager;

a second receiving module 1203, configured to receive adjusted parameter control data sent by the plug-in manager; and a processing module 1204, configured to perform sound effect processing on the data to be processed based on the adjusted parameter control data.

Based on the sound effect plug-in according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

Figure 13:
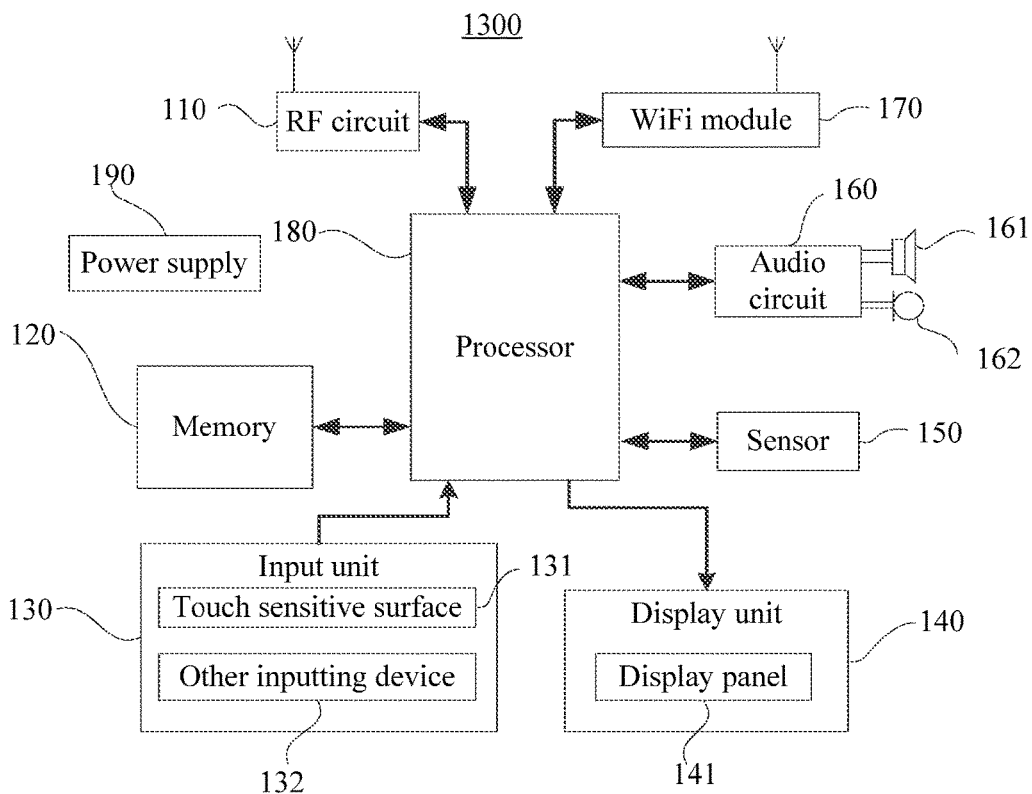
FIG. 13 is a schematic structural diagram of a terminal according to an embodiment of the present disclosure.

As shown in FIG. 13, a terminal is provided according to an embodiment of the present disclosure. FIG. 13 is a schematic structural diagram of the terminal according to the embodiment of the present disclosure. The terminal may be used to implement the sound effect processing method described above. Specifically:

A terminal 1300 may include a RF (Radio Frequency) circuit 110, a memory 120 including one or more computer readable storage media, an input unit 130, a display unit 140, a sensor 150, an audio circuit 160, a WiFi (Wireless Fidelity) module 170, a processor 180 including one or more processing cores, a power supply 190, etc. It can be understood by those skilled in the art that the structure of the terminal illustrated in FIG. 13 is not a limitation to the terminal. The terminal may include more or less components than those illustrated in FIG. 13, or a combination of some components, or a different arrangement of components.

The RF circuit 110 may be configured to receive and send signals during information receiving and sending or during a call, and particularly, to receive downlink information from a base station and then send it to one or more processors 180 for processing, and to send uplink data to a base station. Typically, the RF circuit includes, but is not limited to, an antenna, at least one amplifier, a tuner, one or more oscillators, a subscriber identity module (SIM) card, a transceiver, a coupler, a LNA (Low Noise Amplifier), a duplexer, and so on. In addition, the RF circuit 110 may also communicate with other devices by means of wireless communication or network. The wireless communication may use any communication standard or protocol, which includes, but is not limited to, GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), and so on.

The memory 120 may be configured to store software programs and modules, and the processor 180 performs various functional applications and data processing by running the software programs and modules stored in the memory 120. The memory 120 may include a program storing region and a data storing region, wherein the program storing region can store an operating system and an application program which is required for at least one function (such as an audio playing function and an image playing function); and the data storing region can store data created by use of the terminal 1300 (such as audio data and a phone book). In addition, the memory 120 may include a high speed random access memory, and may also include a non-volatile memory such as at least one magnetic disk storage device or a flash memory, or other volatile solid-state memories. Correspondingly, the memory 120 may further include a memory controller configured to provide access to the memory 120 for the processor 180 and the input unit 130.

The input unit 130 may be configured to receive input number or character information, and to generate a signal related to user's setting and function control, which is input by a keyboard, a mouse, a joystick, or a trackball, or via an optical input. Specifically, the input unit 130 may include a touch sensitive surface 131 and another input device 132. The touch sensitive surface 131, also referred to as a touch screen or a touch panel, can collect user's touch operations on or near the touch sensitive surface (such as use's operations on the touch sensitive surface 131 or near the touch sensitive surface 131 using any proper object or accessory such as finger or stylus), and drive a corresponding connection device based on a preset program. Optionally, the touch sensitive surface 131 may include a touch detecting device and a touch controlling device. The touch detecting device detects a touch position of the user, detects a signal generated by touch operation, and sends the signal to the touch controlling device; the touch controlling device receives touch information from the touch detecting device, converts the touch information into coordinates of the touch point, sends the coordinates to the processor 180, and receives a command from the processor 180 and executes the command. In addition, the touch sensitive surface 131 may be of various types such as resistive type, capacitive type, infrared type or surface acoustic wave type. In addition to the touch sensitive surface 131, the input unit 130 may further include another input device 132. Specifically, the other input device 132 may include, but is not limited to, one or more of a physical keyboard, a function key (such as a volume control key or a switch key), a trackball, a mouse, a joystick and so on.

The display unit 140 may be configured to display information input by the user or information provided to the user, and various graphic user interfaces of the terminal 1300. The graphic user interfaces may consist of graphs, texts, icons, videos and any combination thereof. The display unit 140 may include a display panel 141. Optionally, the display panel 141 may be configured in a form of LCD (Liquid Crystal Display), or OLED (Organic Light-Emitting Diode) or the like. Furthermore, the touch sensitive surface 131 may cover the display panel 141, and when the touch sensitive surface 131 detects a touch operation on or near the touch sensitive surface 131, the touch sensitive surface 131 sends information to the processor 180 to determine the type of touch event; then the processor 180 provides a corresponding visual output on the display panel 141 based on the type of touch event. In FIG. 13, although the touch sensitive surface 131 and the display panel 141 are two separate components used to realize the input function and the output function, the touch sensitive surface 131 and the display panel 141 may be integrated to realize the input function and the output function in some embodiments.

The terminal 1300 may further include at least one sensor 150, such as an optical sensor, a motion sensor and other sensors. Specifically, the optical sensor may include an ambient light sensor and a proximity sensor, the ambient light sensor may adjust brightness of the display panel 141 based on brightness of ambient light, and the proximity sensor may close the display panel 141 and/or backlight in a case that the terminal 1300 moves to the ear. As one of the motion sensors, a gravity acceleration sensor may detect magnitude of an acceleration in each of the directions (typically, three axes), detect the magnitude and direction of gravity while being stationary, recognize a gesture of the mobile phone (such as switching between portrait and landscape orientation, relevant game or calibration of gesture of a magnetometer), and vibratingly recognize relevant functions (such as a pedometer or a click), etc. Other sensors which may be provided for the terminal 1300, such as a gyroscope, a barometer, a hygrometer, a thermometer or an infrared sensor, are not described herein.

The audio circuit 160, a speaker 161 and a microphone 162 may provide an audio interface between the user and the terminal 1300. The audio circuit 160 may send an electrical signal, converted from received audio data, to the speaker 161, and then the speaker 161 converts it into an audio signal for output. On the other hand, the microphone 162 converts the collected audio signal to an electrical signal, the electrical signal is received by the audio circuit 160 and then converted into audio data, and after the audio data is output to the processor 180 and processed, the audio data is for example sent to another terminal via the RF circuit 110, or the audio data is output to the memory 120 for further processing. The audio circuit 160 may further include an earphone jack, so as to provide communications between a peripheral earphone and the terminal 1300.

WiFi belongs to a short-distance wireless transmission technology. The terminal 1300 may facilitate the user in receiving and sending emails, browsing a webpage and accessing stream media via the WiFi module 170 which provides wireless broadband internet access for the user. Although the WiFi module 170 is illustrated in FIG. 13, it can be understood that, the WiFi module 170 is not a necessary constituent of the terminal 1300, and may be omitted as required without altering the scope of the essence of the present disclosure.

The processor 180 is a control center of the terminal 1300. It connects various parts of the mobile phone through various interfaces and circuits, and performs various functions of the terminal 1300 and data processing, by running or executing the software programs and/or modules stored in the memory 120 and invoking data stored in the memory 120, thereby realizing overall monitoring of the mobile phone. The processor 180 may include one or more processing cores. The processor 180 may integrate an application processor and a modem processor, wherein the application processor is configured to process operating systems, user interfaces and applications, and the modem processor is configured to process wireless communications. It can be understood that it is also possible that the above modem processor is not integrated into the processor 180.

The terminal 1300 further includes the power supply 190 (such as a battery) configured to power various components. The power supply may be logically connected with the processor 180 via a power supply management system, so that functions such as charging and discharging management and power consumption management can be realized via the power supply management system. The power supply 190 may further include one or more direct current or alternating current power supplies, a recharging system, a power fault detection circuit, a power adapter or inverter, a power status indicator, and so on.

While not shown in the figure, the terminal 1300 may further include a camera, a bluetooth module, and so on, which will not be described herein. Specifically, in the embodiment, the display unit in the terminal is a touch screen display. The terminal further includes a memory and one or more programs. The one or more programs are stored in the memory and are configured to be executed by one or more processors. The one or more programs include instructions for performing the following operations:

invoking a pre-loaded plug-in manager to obtain a sound effect processing parameter supported by a respective pre-loaded sound effect plug-in, where the number of the sound effect plug-in is at least one;

obtaining a sound effect configuration file pre-configured by the plug-in manager, where the sound effect configuration file includes parameter control data in at least one sound effect mode and a sound effect index identifier corresponding to a respective sound effect mode;

displaying the sound effect index identifier corresponding to the respective sound effect mode, and determining one the displayed sound effect index identifiers as a selected sound effect index identifier;

determining a selected sound effect mode based on the selected sound effect index identifier, displaying, an adjustment interface of the parameter control data in the selected sound effect mode, and obtaining adjusted parameter control data from the displayed adjustment interface;

invoking the plug-in manager to select a sound effect plug-in based on the sound effect processing parameter supported by the respective sound effect plug-in, and sending the adjusted parameter control data to the selected sound effect plug-in; and invoking the plug-in manager to send data to be processed to the selected sound effect plug-in, and performing, by the selected sound effect plug-in, the sound effect processing on the data to be processed based on the adjusted parameter control data.

If the above description is taken as a first possible implementation, then in a second possible implementation provided based on the first possible implementation, the memory of the terminal further includes instructions for executing the following operations:

before the pre-loaded plug-in manager is invoked to obtain the sound effect processing parameter supported by the respective pre-loaded sound effect plug-in, the operations further includes:

loading the plug-in manager and the at least one sound effect plug-in.

In a third possible implementation provided based on the second possible implementation, the memory of the terminal further includes instructions for executing the following operations:

compiling the plug-in manager to be a corresponding dynamic library file, and compiling each sound effect plug-in to be a corresponding dynamic library file; and loading the plug-in manager and the at least one sound effect plug-in includes:

loading the dynamic library file corresponding to the plug-in manager and the dynamic library file corresponding to the respective sound effect plug-in.

In a fourth possible implementation provided based on the first possible implementation, the memory of the terminal further includes instructions for executing the following operations:

before the pre-loaded plug-in manager is invoked to obtain the sound effect processing parameter supported by the respective pre-loaded sound effect plug-in, the operations includes:

invoking the plug-in manager to configure the sound effect processing parameter supported by the respective sound effect plug-in loaded, determining the parameter control data in the sound effect mode corresponding to the respective sound effect plug-in based on the sound effect processing parameter supported by the respective sound effect plug-in, and setting the sound effect index identifier corresponding to the respective sound effect mode; and determining the parameter control data in the respective sound effect mode and the sound effect index identifier corresponding to the respective sound effect mode as a configuration result to be written into the sound effect configuration file, and storing the sound effect configuration file.

In a fifth possible implementation provided based on the fourth possible implementation, the memory of the terminal further includes instructions for executing the following operations:

after the plug-in manager is invoked so as to determine the parameter control data in the respective sound effect mode and the sound effect index identifier corresponding to the respective sound effect mode as the configuration result to be written into the sound effect configuration file, the operations includes:

updating the configuration result in the sound effect configuration file configured by the plug-in manager, and invoking the plug-in manager to store the updated sound effect configuration file.

To sum up, based on the terminal according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

A computer readable storage medium is provided according to an embodiment of the present disclosure. The computer readable storage medium can be a computer readable storage medium included in the memory in the above described embodiments; or a separate computer readable storage medium which is not disposed in a terminal. The computer readable storage medium stores one or more instructions. The one or more instructions are used by one or more processors to implement a sound effect processing method, which includes:

invoking a pre-loaded plug-in manager to obtain a sound effect processing parameter supported by the respective pre-loaded sound effect plug-in, where the number of the sound effect plug-in is at least one;

obtaining a sound effect configuration file pre-configured by the plug-in manager, where the sound effect configuration file includes parameter control data in at least one sound effect mode and a sound effect index identifier corresponding to the respective sound effect mode;

displaying the sound effect index identifier corresponding to the respective sound effect mode, and determining one displayed sound effect index identifier as a selected sound effect index identifier;

determining a selected sound effect mode based on the selected sound effect index identifier, displaying an adjustment interface of the parameter control data in the selected sound effect mode, and obtaining adjusted parameter control data from the displayed adjustment interface;

invoking the plug-in manager to select a sound effect plug-in based on the sound effect processing parameter supported by the respective sound effect plug-in, and sending the adjusted parameter control data to the selected sound effect plug-in; and invoking the plug-in manager to send data to be processed to the selected sound effect plug-in, and performing, by the selected sound effect plug-in, the sound effect processing on the data to be processed based on the adjusted parameter control data.

If the above description is taken as a first possible implementation, then in a second possible implementation provided based on the first possible implementation, the computer readable storage medium further includes instructions for executing the following operations:

before the pre-loaded plug-in manager loaded is invoked to obtain the sound effect processing parameter supported by the respective pre-loaded sound effect plug-in, the operations further include:

loading the plug-in manager and the at least one sound effect plug-in.

In a third possible implementation provided based on the second possible implementation, the computer readable storage medium further includes instructions for executing the following operations:

compiling the plug-in manager to be a corresponding dynamic library file, and compiling each sound effect plug-in to be a corresponding dynamic library file; and loading the plug-in manager and the at least one sound effect plug-in includes:

loading the dynamic library file corresponding to the plug-in manager and the dynamic library file corresponding to the respective sound effect plug-in.

In a fourth possible implementation provided based on the third possible implementation, the computer readable storage medium further includes instructions for executing the following operations:

before the pre-loaded plug-in manager is invoked to obtain the sound effect processing parameter supported by the respective pre-loaded sound effect plug-in, the operations further include:

invoking the plug-in manager to configure the sound effect processing parameter supported by the respective sound effect plug-in loaded, determining the parameter control data in the sound effect mode corresponding to the respective sound effect plug-in based on the sound effect processing parameter supported by the respective sound effect plug-in, and setting the sound effect index identifier corresponding to the respective sound effect mode; and determining the parameter control data in the respective sound effect mode and the sound effect index identifier corresponding to the respective sound effect mode as a configuration result to be written into the sound effect configuration file, and storing the sound effect configuration file.

In a fifth possible implementation provided based on the fourth possible implementation, the computer readable storage medium further includes instructions for executing the following operations:

after the plug-in manager is invoked so as to determine the parameter control data in the respective sound effect mode and the sound effect index identifier corresponding to the respective sound effect mode as the configuration result to be written into the sound effect configuration file, the operations further include:

updating the configuration result in the sound effect configuration file configured by the plug-in manager, and invoking the plug-in manager to store the updated sound effect configuration file.

To sum up, based on the computer readable storage medium according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

A graphic user interface is provided according to an embodiment of the present disclosure. The graphic user interface is applied to a terminal including a touch screen display, a memory and one or more processors configured to run one or more programs. The graphic user interface includes:

invoking a pre-loaded plug-in manager to obtain a sound effect processing parameter supported by a respective pre-loaded sound effect plug-in, where the number of the sound effect plug-in is at least one;

obtaining a sound effect configuration file pre-configured by the plug-in manager, where the sound effect configuration file includes parameter control data in at least one sound effect mode and a sound effect index identifier corresponding to a respective sound effect mode;

displaying the sound effect index identifier corresponding to the respective sound effect mode, and determining one displayed sound effect index identifier as a selected sound effect index identifier;

determining a selected sound effect mode based on the selected sound effect index identifier, displaying an adjustment interface of the parameter control data in the selected sound effect mode, and obtaining adjusted parameter control data from the displayed adjustment interface;

invoking the plug-in manager to select a sound effect plug-in based on the sound effect processing parameter supported by the respective sound effect plug-in, and sending the adjusted parameter control data to the selected sound effect plug-in; and invoking the plug-in manager to send data to be processed to the selected sound effect plug-in, and performing, by the selected sound effect plug-in, the sound effect processing on the data to be processed based on the adjusted parameter control data.

To sum up, based on the graphic user interface according to the embodiment of the present disclosure, the data to be processed is processed by the sound effect plug-in based on the adjusted parameter control data, so that the sound effect processing can be realized without the need for installing hardware. In addition, not only the technical solutions are suitable for different operating systems, but also there is no need to add codes again. Therefore, the cost of the sound effect processing is reduced, and the application scope of the sound effect processing is expanded. In addition, change of sound effect can be realized by simply modifying the sound effect configuration file, thereby improving the efficiency of sound effect processing.

It should be noted that, the sound effect processing device, the plug-in manager and the sound effect plug-in provided in the above embodiments are illustrated merely in a sense of dividing various functional modules; in practical applications, the above functions may be assigned to different functional modules as actually required; that is, the internal structure of the device may be divided into different functional modules so as to implement all or some of the functions described above. In addition, the sound effect processing device, the plug-in manager, the sound effect plug-in and the sound effect processing method according to the above embodiments belong to the same concept. For more details of the implementation, please refer to the description of the method embodiments, and a repeated discussion is omitted herein.

It can be understood by those skilled in the art that, all or some of the steps in the above embodiments may be implemented by hardware, or by related hardware following an instruction from a program. The program may be stored in a computer readable storage medium, and the above-mentioned storage medium may be a read-only memory, a magnetic disk or an optical disk, and so on.

Only preferred embodiments of the present disclosure are described above, and are not provided for limiting the present disclosure. Changes, equivalents and improvements made within the spirit and principle of the present disclosure will fall within the scope of protection of the present disclosure.

The invention claimed is:

1. A sound effect processing method, comprising:
    invoking a pre-loaded plug-in manager to configure a plurality of sound effect processing parameters supported by a plurality of pre-loaded sound effect plug-ins respectively;
    determining parameter control data in each of a plurality of sound effect modes corresponding to the pre-loaded sound effect plug-ins respectively, wherein the parameter control data in the respective sound effect mode is determined based on the sound effect processing parameter supported by the corresponding pre-loaded sound effect plug-in;
    invoking the pre-loaded plug-in manager to obtain the plurality of sound effect processing parameters supported by the respective pre-loaded sound effect plug-ins;
    obtaining a sound effect configuration file pre-configured by the pre-loaded plug-in manager, wherein the sound effect configuration file comprises the parameter control data in the plurality of sound effect modes and a plurality of sound effect index identifiers corresponding to the respective sound effect modes;
    displaying the plurality of sound effect index identifiers corresponding to the respective sound effect modes, and selecting, in response to a user selection from the plurality of sound effect index identifiers, a first displayed sound effect index identifier;
    determining a selected sound effect mode based on the selected sound effect index identifier, displaying an adjustment interface of the parameter control data in the selected sound effect mode, wherein a value of the parameter control data is default value corresponding to the selected sound effect mode, and obtaining adjusted parameter control data from the displayed adjustment interface;
    invoking the pre-loaded plug-in manager, to select a sound effect plug-in based on the sound effect processing parameter supported by the pre-loaded sound effect plug-in corresponding to the selected sound effect mode, and sending the adjusted parameter control data to the selected sound effect plug-in;
    after selecting the first sound effect index identifier and obtaining the adjusted parameter control data, receiving audio data; and
    invoking the pre-loaded plug-in manager to send the received audio data to be processed to the selected sound effect plug-in, and performing, by the selected sound effect plug-in, the sound effect processing on the data to be processed based on the adjusted parameter control data.

2. The method according to claim 1, wherein before invoking the pre-loaded plug-in manager to configure the plurality of sound effect processing parameters supported by the plurality of pre-loaded sound effect plug-ins, the method comprises:
    loading the plug-in manager and the plurality of sound effect plug-ins.

3. The method according to claim 2, wherein the plug-in manager is compiled to be a corresponding dynamic library file, and the plurality of sound effect plug-ins are compiled to be a corresponding dynamic library file; and
    loading the plug-in manager and the plurality of sound effect plug-ins comprises:
    loading the dynamic library file corresponding to the plug-in manager and the dynamic library file corresponding to the respective sound effect plug-in.

4. The method according to claim 1, wherein before invoking the pre-loaded plug-in manager to configure the plurality of sound effect processing parameters supported by the plurality of pre-loaded sound effect plug-ins, the method comprises:
    setting the plurality of sound effect index identifiers corresponding to the respective sound effect modes;
    determining the parameter control data in the respective sound effect modes and the sound effect index identifiers corresponding to the respective sound effect modes as respective configuration results to be written into the sound effect configuration file; and
    storing the sound effect configuration file.

5. The method according to claim 4, wherein after invoking the pre-loaded plug-in manager to determine the parameter control data in the respective sound effect modes and the sound effect index identifiers corresponding to the respective sound effect modes as the respective configuration results to be written into the sound effect configuration file, the method comprises:
    updating the configuration result in the sound effect configuration file configured by the pre-loaded plug-in manager, and invoking the pre-loaded plug-in manager to store the updated sound effect configuration file.

6. The method according to claim 4, wherein the sound effect configuration file or an updated sound effect configuration file is stored in a memory of the pre-loaded plug-in manager.

7. The method according to claim 4, wherein the sound effect configuration file or an updated sound effect configuration file is stored in a cloud memory.

8. A sound effect processing device, comprising a processor and a memory storing program instructions, wherein the processor performs the stored program instructions to:
invoke a pre-loaded plug-in manager to configure a plurality of sound effect processing parameters supported by a plurality of pre-loaded sound effect plug-ins respectively;
determine parameter control data in each of a plurality of sound effect modes corresponding to the pre-loaded sound effect plug-ins respectively, wherein the parameter control data in the respective sound effect mode is determined based on the sound effect processing parameter supported by the corresponding pre-loaded sound effect plug-in;
invoke the pre-loaded plug-in manager to obtain the plurality of sound effect processing parameters supported by the respective pre-loaded sound effect plug-ins;
obtain a sound effect configuration file pre-configured by the pre-loaded plug-in manager, wherein the sound effect configuration file comprises the parameter control data in the plurality of sound effect modes and a plurality of sound effect index identifiers corresponding to the respective sound effect modes;
display the plurality of sound effect index identifiers corresponding to the respective sound effect modes:
select, in response to a user selection from the plurality of sound effect index identifiers, a first displayed sound effect index identifier;
determine a selected sound effect mode based on the selected sound effect index identifier;
display an adjustment interface of the parameter control data in the selected sound effect mode, wherein a value of the parameter control data is default value corresponding to the selected sound effect mode;
obtain adjusted parameter control data from the displayed adjustment interface;
invoke the pre-loaded plug-in manager, to select a sound effect plug-in based on the sound effect processing parameter supported by the pre-loaded sound effect plug-in corresponding to the selected sound effect mode, and send the adjusted parameter control data to the selected sound effect plug-in;
after selecting the first sound effect index identifier and obtaining the adjusted parameter control data, receive audio data; and
invoke the pre-loaded plug-in manager to send the received audio data to be processed to the selected sound effect plug-in, wherein the selected sound effect plug-in performs the sound effect processing on the data to be processed based on the adjusted parameter control data.

9. The device according to claim 8, wherein the processor further performs the stored program instructions to:
load the plug-in manager and the plurality of sound effect plug-ins.

10. The device according to claim 9, wherein the plug-in manager is compiled to be a corresponding dynamic library file, and each sound effect plug-in is compiled to be a corresponding dynamic library file; and the processor further performs the stored program instructions to
load the dynamic library file corresponding to the plug-in manager and the dynamic library file corresponding to the respective sound effect plug-in.

11. The device according to claim 8, wherein the processor further performs the stored program instructions to:
set the plurality of sound effect index identifiers corresponding to the respective sound effect modes; and
determine the parameter control data in the respective sound effect modes and the sound effect index identifiers corresponding to the respective sound effect modes as respective configuration results to be written into the sound effect configuration file; and
store the sound effect configuration file.

12. The device according to claim 11, wherein the processor further performs the stored program instructions to:
update the configuration result in the sound effect configuration file configured by the pre-loaded plug-in manager; and
invoke the pre-loaded plug-in manager to store the updated sound effect configuration file.

13. The device according to claim 11, wherein the sound effect configuration file or an updated sound effect configuration file is stored in a memory of the pre-loaded plug-in manager.

14. The device according to claim 11, wherein the sound effect configuration file or an updated sound effect configuration file is stored in a cloud memory.

* * * * *